No. 720,642. PATENTED FEB. 17, 1903.
P. J. WAGENER.
BOLT LOCK.
APPLICATION FILED FEB. 1, 1902.
NO MODEL.

WITNESSES
INVENTOR

UNITED STATES PATENT OFFICE.

PHILLIP J. WAGENER, OF PITTSBURG, PENNSYLVANIA.

BOLT-LOCK.

SPECIFICATION forming part of Letters Patent No. 720,642, dated February 17, 1903.

Application filed February 1, 1902. Serial No. 92,164. (No model.)

*To all whom it may concern:*

Be it known that I, PHILLIP J. WAGENER, of Pittsburg, in the county of Allegheny and State of Pennsylvania, have invented a certain new and useful Improvement in Bolt-Locks, of which the following is a full, clear, and exact description, reference being had to the accompanying drawings, forming a part of this specification, in which—

Figure 1:
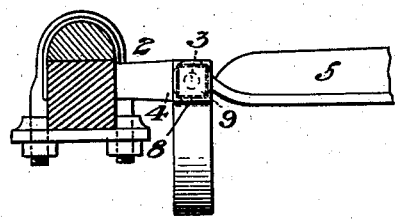
Figure 2:
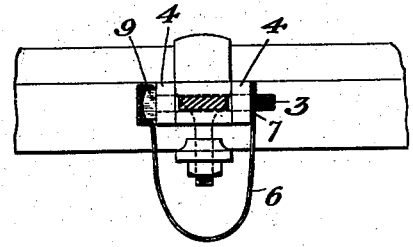
Figure 3:
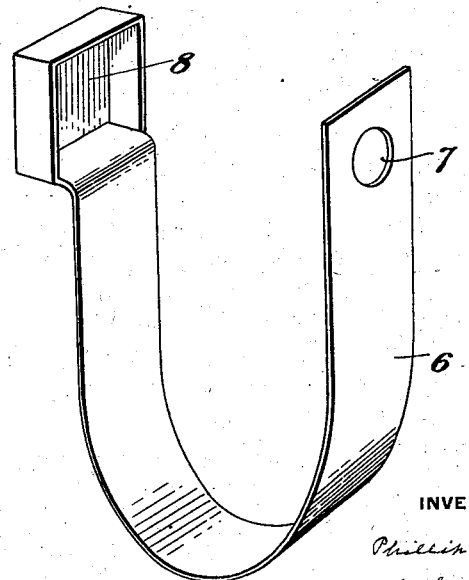

Figure 1 is a side elevation of my improved bolt-lock as applied to a thill-coupling. Fig. 2 is a front elevation of the same, and Fig. 3 is a detached perspective view of the lock.

The object of my invention is to provide such a means for securing a bolt in a clevis, thill-coupling, or other device where it is necessary that the bolt be held securely and yet at the same time be easily and rapidly removed.

To this end my invention consists in a U-shaped yoke, one arm of which is provided with an aperture through which the shank of the bolt may pass and the other arm of which is provided with a seat for the head at the other end of the bolt, the seat being in such form as to fit about the bolt-head and hold the same against relative rotation, whereby the lock is retained on the bolt and the bolt is prevented from escaping from the coupling, clevis, or other device to which it is applied.

I will now describe my invention, so that others skilled in the art may manufacture and use the same.

In the drawings, 2 represents a thill-coupling coupled by means of the bolt 3, which passes through the jaws 4 and the eye of the thill 5.

The bolt-lock 6 may be formed of sheet-steel or other metal bent in the form of a U, at the end of one arm of which is the opening 7, adapted for the passage of the shank of the bolt, and on the end of the other arm is the seat 8, formed in the shape of a box and adapted to receive and inclose the head 9 of the bolt 3 and hold the same against relative rotation.

The operation is as follows: When it is desired to attach the shafts to the vehicle, the socket on the end of the thill is placed between the jaws of the coupler, and the bolt is passed through the eyes of the coupler and the thill. The spring-lock 6 is then placed over the bolt by springing the arms so that the seat 8 shall inclose the head 9 of the bolt 3 and the eye 7 of the lock shall pass over the other end of the bolt, thereby securing the bolt in position and preventing it from escaping from the thill.

The advantages of my invention will be apparent to those skilled in the art, as all nuts and nut-locks are done away with, and a secure fastening for the bolt is provided which may be easily and rapidly removed, permitting the instantaneous change of a pole for a shaft or a shaft for a pole.

Although I have described my invention as applied to a thill-coupling, I do not desire to limit myself thereto, as it may be employed in almost any case where a lock for a bolt is required.

I do not desire to limit myself to the exact form of device shown in the drawings nor to any material.

Having thus described my invention, what I claim, and desire to secure by Letters Patent, is—

1. A bolt-lock, consisting of a yoke having an aperture in one arm for one end of a bolt, and a seat in the other arm for engaging the other end of the bolt and for holding it against relative rotation, substantially as described.

2. A bolt-lock, consisting of a spring-yoke, having an aperture in one arm for one end of a bolt, and a seat in the other arm for engaging the other end of the bolt and holding it against relative rotation; substantially as described.

3. A bolt-lock, consisting of a yoke, one arm of which is provided with means for engaging one end of a bolt and the other arm with means for engaging the other end of the bolt and holding it against relative rotation; substantially as described.

In testimony whereof I have hereunto set my hand.

PHILLIP J. WAGENER.

Witnesses:
A. M. STEEN,
JAMES K. BAKEWELL.